US008583143B2

(12) United States Patent
Hartmaier et al.

(10) Patent No.: US 8,583,143 B2
(45) Date of Patent: Nov. 12, 2013

(54) NETWORK-BASED IMPLEMENTATION OF VELOCITY CONTROLS FOR A MOBILE COMMUNICATION DEVICE

(75) Inventors: Peter Hartmaier, Woodinville, WA (US); William Thomas Cooper, Henderson, CO (US); Utpal Thakrar, Goleta, CA (US)

(73) Assignee: Unwired Planet, LLC, Reno, NV (US)

( * ) Notice: Subject to any disclaimer, the term of this patent is extended or adjusted under 35 U.S.C. 154(b) by 618 days.

(21) Appl. No.: 12/537,226

(22) Filed: Aug. 6, 2009

(65) Prior Publication Data

US 2011/0034185 A1 Feb. 10, 2011

(51) Int. Cl.
*H04W 24/00* (2009.01)

(52) U.S. Cl.
USPC ............... 455/456.4; 455/456.1; 455/441; 455/445; 455/419; 379/88.21

(58) Field of Classification Search
USPC ........... 455/456.1, 441, 445, 459.1, 567, 419; 379/88.21
See application file for complete search history.

(56) References Cited

U.S. PATENT DOCUMENTS

| | | | |
|---|---|---|---|
| 6,337,972 B1 * | 1/2002 | Jones et al. | 340/7.57 |
| 7,181,229 B2 | 2/2007 | Singh et al. | |
| 2005/0037760 A1 | 2/2005 | Maruyama | |
| 2006/0099940 A1 * | 5/2006 | Pfleging et al. | 455/419 |
| 2007/0072616 A1 * | 3/2007 | Irani | 455/441 |
| 2008/0192905 A1 * | 8/2008 | Fujita-Yuhas | 379/88.21 |
| 2009/0138949 A1 | 5/2009 | O'Neill | |
| 2009/0149168 A1 | 6/2009 | McLean | |
| 2009/0163243 A1 | 6/2009 | Barbera | |
| 2009/0275281 A1 | 11/2009 | Rosen | |

FOREIGN PATENT DOCUMENTS

WO 0111544 A1 1/2001

OTHER PUBLICATIONS

"How Does It Work?" Textecution, pp. 1-2, available at http://www.textecution.com/how_does_it_work.php, last visited Jul. 17, 2009.
"Frequently Asked Questions" Textecution, pp. 1-3, available at http://www.textecution.com/faqs.php, last visited Jul. 17, 2009.
"How DriveAssist Works" Aegis Mobility, pp. 1-2, available at http://www.aegismobility.com/index.php/How-DriveAssist-Works.html, last visited Jul. 17, 2009.
"DriveAssist Does Not Block Calls" Aegis Mobility, pp. 1-2, available at http://www.aegismobility.com/index.php/DriveAssist-Does-Not-Block-Calls.html, last visited Jul 17, 2009.
"Technology" Key 2 Safe Driving, pp. 1-2, available at http://www.key2safedriving.net/Technology.aspx, last visited Jul. 17, 2009.

* cited by examiner

*Primary Examiner* — Kamran Afshar
*Assistant Examiner* — Shahriar Behnamian

(57) ABSTRACT

A communication network includes a wireless network, a location platform, and a network component. The wireless network includes a base station to send data to and receive data from a mobile station via radio frequency communication signals. The location platform is operably coupled to the wireless network. In one embodiment, the location platform computes a velocity of the mobile station in response to a velocity request. The network component is operably coupled between the wireless network and the location platform. In one embodiment, the network component compares the computed velocity of the mobile station with a velocity threshold in response to an attempted communication involving the mobile station. The network component also implements a restrictive action for the attempted communication involving the mobile station in response to a determination that the computed velocity exceeds the velocity threshold.

19 Claims, 8 Drawing Sheets

NETWORK-BASED IMPLEMENTATION OF VELOCITY CONTROLS FOR A MOBILE COMMUNICATION DEVICE

BACKGROUND

Sending or receiving messages using mobile communication devices is common among various user groups. Conventional mobile communication devices allow users to communicate with one another via voice, text, and multimedia messages. Also, many mobile communication devices allow users to access information available over the internet. So mobile devices increase the ability and the number of ways that people can communicate with each other.

While mobile communication devices can increase the ability to communicate with other people in a variety of ways, use of mobile communication devices can be inappropriate, and even dangerous, in some situations. Consequently, many public service safety campaigns are directed to limiting or eliminating the use of mobile communication devices while a user is driving. In fact, many jurisdictions have statutes which make certain uses of a mobile communication device illegal while driving.

A conventional solution to this problem relies on implementing restrictive functionality within the mobile communication device. Solutions implemented within the mobile communication device are client-based implementations. For example, some device manufacturers or service providers allow client-based applications (i.e., software loaded onto the mobile communication device) to block some of the communication functionality of the mobile communication device if the mobile communication device is determined to be traveling at typical vehicular speeds. Blocking functionality in this manner is based on the presumption that the user is occupied with driving when the mobile communication device is traveling at such speeds.

However, implementing client-based applications for control over the functionality of mobile communication devices can have potential disadvantages. For example, users can often bypass or disable functionality that is located on their own mobile communication device. Also, the installation of the client-based software can be difficult for a user, and such software may require some type of user configuration and/or approvals. Hence, there is an opportunity for users to inadvertently install or configure the software incorrectly. Support for client based software is difficult and various programs could interfere with each other. One disadvantage of client based solutions is that they do not work on all phones. It is very difficult to mandate the use unless the feature is generally available. The commercial viability is greatly enhanced when all phones are capable of using the service. These and other potential disadvantages reduce the effectiveness of client-based implementations to control device functionality.

SUMMARY

Embodiments of a system are described. In one embodiment, the system is a communication network. An embodiment of the communication network includes a wireless network, a location platform, and a network component. The wireless network includes a base station to send data to and receive data from a mobile station via radio frequency communication signals. The location platform is operably coupled to the wireless network. In one embodiment, the location platform computes a velocity of the mobile station relative to the base station in response to a velocity request. The network component is operably coupled between the wireless network and the location platform. In another embodiment, the network component compares the computed velocity of the mobile station with a velocity threshold in response to an attempted communication involving the mobile station. The network component also implements a restrictive action for the attempted communication involving the mobile station in response to a determination that the computed velocity exceeds the velocity threshold. Other embodiments of the system are also described.

Embodiments of a method are also described. In one embodiment, the method is a method for controlling network communications. The method includes receiving a request to initiate a network communication between a mobile station operably coupled to a wireless network and another communication device. The method also includes computing a velocity of the mobile station in response to the request to initiate the network communication. The method also includes comparing the computed velocity of the mobile station with a velocity threshold. The method also includes implementing a restrictive action to prevent completion of the network communication in response to a determination that the computed velocity of the mobile station exceeds the velocity threshold. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
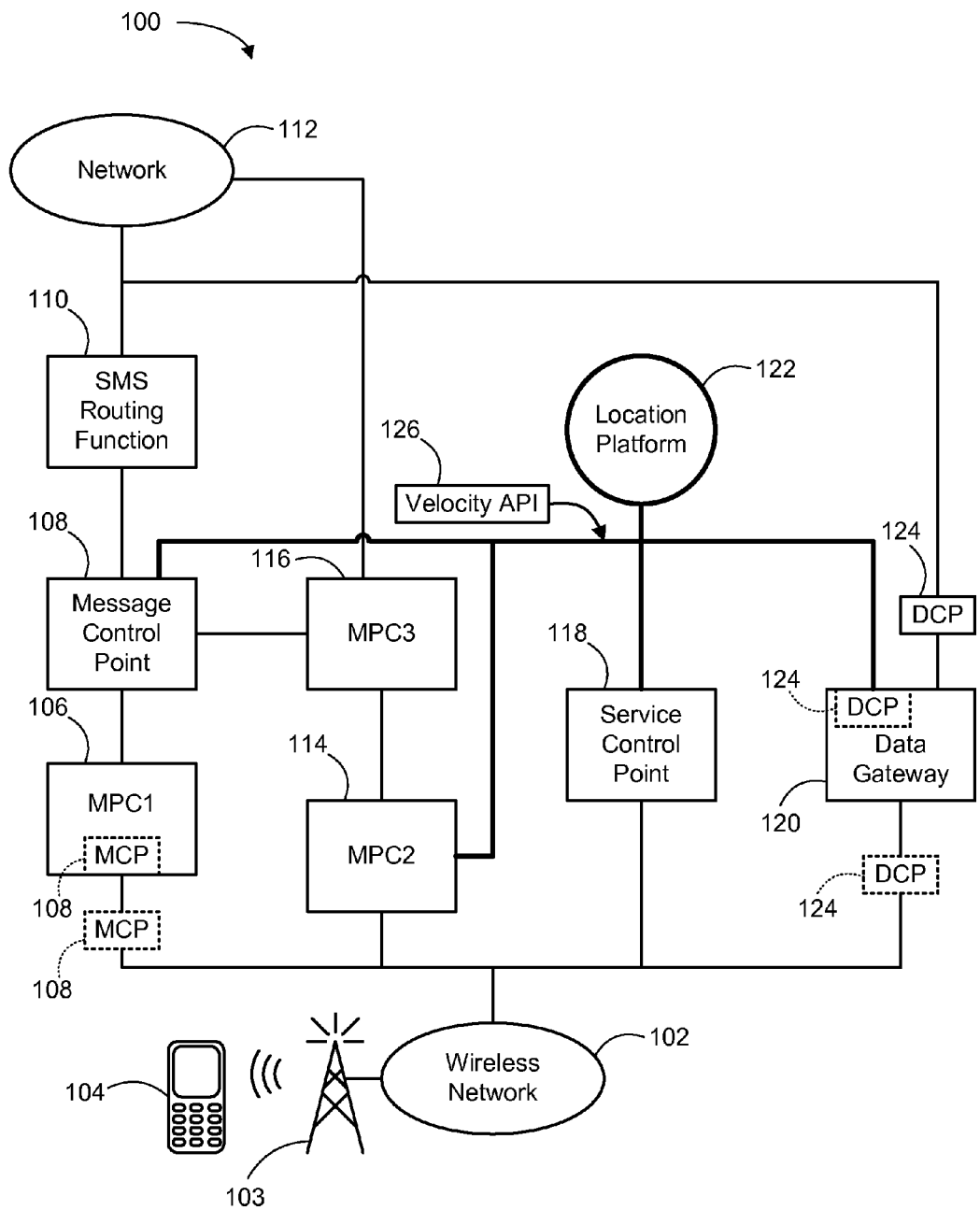
FIG. 1 depicts a schematic block diagram of one embodiment of a network system for implementing mobile communications.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments implement a method of blocking functionality of a mobile station while the mobile station is moving at a speed consistent with the operation of a motor vehicle. In particular embodiments, the network system blocks the functionality for sending and receiving messages. The types of messages that may be blocked include, but are not limited to, short messaging service (SMS) messages (i.e., text messages) and multimedia messaging service (MMS) messages (e.g., video, photos, music, etc.). The functionality also may block voice messages (i.e., incoming and/or outgoing telephone calls) and data communications (e.g., internet browser data). In some embodiments, a user may obtain an override to unblock the restricted functionality. For example, a passenger in car (or on a train or boat) may manually override the restriction on sending and receiving messages. These and other embodiments are described in more detail below with reference to the appended figures.

FIG. 1 depicts a schematic block diagram of one embodiment of a network system 100 for implementing mobile communications. The illustrated network system 100 includes various network components, which are described herein. Although the network system 100 is shown and described with certain components and functionality, other embodiments of the network system 100 may include fewer or more components to implement less or more functionality.

In one embodiment, the network system 100 includes a wireless network 102. In general, the wireless network 102 includes one or more transceivers to facilitate communications among devices that are within a communication range of the transceivers. Each base station 103 has at least one transceiver. The base station 103 communicates with one or more mobile stations 104 using radio frequency (RF) communication signals. In this way, the base station can send data signals to and receive data signals from the mobile station 104. For convenience, the communications sent to the mobile station 104 are designated as mobile terminating (MT) operations, while the communications sent from the mobile station 104 are designated as mobile originating (MO) operations.

The data signals communicated to and from the mobile station 104 can include, but is not limited to, analog and/or digital RF signals (i.e., radio waves) for any type of communication mode, including text messaging, multimedia messaging, voice calling, and internet browsing. The wireless network 102 can facilitate network communications among multiple mobile stations 104 within the same wireless network 102. Also, the wireless network 102 can interface with other components of the network system 100 to facilitate network communications between a mobile station 104 within the wireless network 102 and another communication device that is outside of the wireless network 102.

In order to facilitate text messages (i.e., SMS messages), the network system 100 includes a first message processing center (MPC1) 106, which could be, for example, a short message service center (SMSC), a message control point (MCP) 108, and a SMS routing function 110. The SMS routing function 110 is coupled to one or more networks 112 (which may include internal and external networks) to which other communication devices or data sources (not shown) may be coupled. The SMS routing function 110 also may be shown internal to the MPC1 106 or the MCP 108. The MCP 108 also may be internal to MPC1 106 (shown dashed within the MPC1 106) or, in some embodiments, on the opposite side of the MPC1 106 (shown dashed between the MPC1 106 and wireless network 102). In the case where the MCP 108 is internal to the MPC1 106, a protocol such as, for example, the signaling system number 7 (SS7) protocol will enter the MCP 108 and then through conventional methods, the SS7 protocol will be translated into an internet protocol (IP) protocol so that the MCP 108 can operate on the data. Once the MCP 108 has operated on the data, the MPC1 106 will operate on the data. In one embodiment, the MPC1 106 receives a text message and stores the text message until the text message can be delivered to the destination device. This type of delivery process is referred to as a store-and-forward delivery scheme. Alternatively, the MPC1 106 may attempt to deliver the text message only once. This type of delivery process is referred to as a forward-and-forget delivery scheme. The text messages are routed through the MCP 108 to the SMS routing function 110, which prepares the text messages for delivery to the indicated destination device over the network 112. In one embodiment, the MPC1 106 uses, for example, a global system for mobile communications (GSM)/SS7 communication protocol or an interim standard 41 (IS-41)/interim standard 95 (IS-95)/SS7 communication protocol to communicate with the wireless network 102. Other embodiments may use other communication protocols. Other conventional operations of the MPC1 106, the MCP 108, and the SMS routing function 110 are known and, hence, are not described further herein.

In contrast to conventional network systems in which the SMS routing function does the routing, the network system 100 of FIG. 1 includes the MCP 108 to examine message headers and, using a source address, look up in a subscriber database if a control is to be applied to a particular mobile station. In one embodiment, the MCP 108 holds the message pending this check and, if the control is specified, applies the control to the message. If the control is not specified, then the MCP 108 permits the message to go through without additional delay. In this way, the MCP 108 can act as a monitor to identify messages subject to specified controls and to apply the specified controls to the identified messages. As indicated above, the exact location of the implementation of the functionality for the MCP 108 is not critical. In some embodiments, the functionality of the MCP 108 is implemented within the SMS routing function 110.

In order to facilitate multimedia messages, the network system 100 also includes a second message processing center (MPC2) 114, which may be, for example, a multimedia interface (MM1) Proxy. The network system 100 also includes a third message processing center (MPC3) 116, which may be, for example, a multimedia message service center (MMSC). In general, the MPC2 114 provides an interface between the mobile station 104 and the MPC3 116. The MPC3 116 operates for multimedia messages in some ways like the MPC1 106 operates for text messages. In particular, the MPC3 116 receives multimedia messages and employs operations to implement store-and-notify. The MPC3 116 may interface with the SMS routing function 110 in order facilitate communications via the network 112. In one embodiment, the MPC2 114 uses a MM1/hypertext transfer protocol (HTTP) communication protocol to communicate with the wireless network 102, and the MPC3 116 uses SMS push notifications to communicate with the MCP 108. Other embodiments may use other communication protocols. Other conventional operations of the MPC2 114 and the MPC3 116 are known and, hence, are not described further herein.

The MPC3 116 typically receives a message destined for a mobile subscriber. The MPC3 116 will store the message and the send a notification to the mobile handset 104 (sometimes called PUSH notifications and may use the PAP (Push Access Protocol)). The mobile handset 104 receives this notification which causes the mobile handset 104 to fetch the message at the location indicated in the PAP message. The MPC3 116 may use Open Mobile Alliance (OMA) PUSH or SMS PUSH to send the notification to the mobile handset 104. The mobile handset 104 may or may not alert the user of the notification and request user interaction.

In order to facilitate voice calls, the network system 100 also includes a service control point (SCP) 118. In general, the SCP 118 coordinates with a service data point (not shown) which includes a database and directory for routing telephone calls. In one embodiment, the SCP 118 uses a conventional voice signaling communication protocol to communicate with the wireless network 102. Other embodiments may use other communication protocols. Other conventional operations of the SCP 118 are known and, hence, are not described further herein. For example, the SCP 118 typically uses customized applications for mobile network enhanced logic (CAMEL), wireless intelligent network (WIN), IS-41 or mobile application part (MAP) protocols.

In order to facilitate internet browsing capabilities, the network system 100 also includes a data gateway 120. In general, the data gateway 120 configures outgoing data access requests for use with one or more of the network 112. The data gateway 120 also configures incoming data for use by or display on the mobile station 104. As shown, the data gateway 120 may interface directly with one or more of the network 112, although other embodiments may include other intermediate circuitry.

In one embodiment, the data gateway 120 uses a wireless application protocol (WAP) or HTTP communication protocol to communicate with the wireless network 102. Other embodiments may use other communication protocols. In another embodiment, a digital control point (DCP) 124 may be used. In this configuration, DCP 124 provides a control point for the data stream to allow the velocity check. The DCP 124 may be called a Service Enabler, in some embodiments. Alternatively, the DCP 124 may be used internal to the data gateway 120 (shown dashed within the data gateway 120). Alternatively, the DCP may be used external to the data gateway 120 (shown dashed between the data gateway 120 and the wireless network 102). Other conventional operations of the data gateway 120 are known. For example, the data gateway 120 can be a WAP Gateway which converts the WAP protocol used by the wireless network 102 to the HTTP protocol used by the Internet. The data gateway 120 also may provide authentication and data formatting functions.

In order to facilitate velocity based control of the functionality available to a user of the mobile station 104, the network system 100 also includes a location platform 122. In the illustrated embodiment, the location platform 122 is coupled to each of the MCP 108, the MPC2 114, the SCP 118, and the data gateway 120. In general, the location platform 122 is a network component that is capable of computing a velocity of the mobile station 104. In one embodiment, the location platform 122 computes the velocity of the mobile station 104 relative to the base station 103. In another embodiment, the location platform 122 tracks global positioning system (GPS) coordinates of the mobile station 104 to compute the velocity of the mobile station 104. Angle of Arrival and Time Difference of Arrival are other conventional methods of locating a mobile station. For example, a typical method for locating a mobile station can be found in the online reference, Wikipedia, at http://en.wikipedia.org/wiki/Location-based service. The type of method implemented by the location platform 122 is not dependant on the mobile station 104 or any software in the mobile station 104.

In one embodiment, the location platform 122 is ready to receive a velocity request from any of the network components within the network system 100. For reference, the velocity request also may be referred to as a velocity API 126, in reference to the application program interface (API) that may be implemented to define how each of the network components may interface with the location platform 122. The velocity API 126, implemented on each of the MCP 108, the MPC2 114, the SCP 118, and the data gateway 120 (generically called a Control Point for the purposed of describing the API 126 function) could be a simple message query/response or a higher level procedural call. In one embodiment, the Control Point will hold or suspend the action, then use the API to ask either for the net velocity of the mobile station 104 or for two position fixes within a specific period of time. In the scenario in which the Control Point obtains the net velocity, the net velocity is determined by the location platform 122. Determining the velocity is well known and may be accomplished by locating the mobile at two successive times and computing the velocity. In the scenario in which the Control Point obtains position and time information, the Control Point computes the velocity of the mobile station 104.

By allowing various network components within the network system 100 to communicate with the location platform 122, the location platform 122 can compute the velocity of the mobile station 104 and communicate the computed velocity to the requesting network component. Alternatively, the location platform 122 can provide position and time information, from which the requesting network component can compute the velocity of the mobile station 104. This allows the requesting network component to determine if the mobile station 104 is moving at a velocity above which some or all of the functionality of the mobile station 104 may be restricted. In a specific embodiment, each network component that interfaces with the location platform 122 is able to compare the computed velocity of the mobile station 104 with a velocity threshold in order to determine if the functionality of the mobile station 104 should be restricted. In general, the velocity threshold defines a velocity indicative of movement of a traveling vehicle. If the computed velocity of the mobile station 104 exceeds the velocity threshold, then specified functionality of the mobile station 104 may be restricted within the network system 100. Otherwise, if the computed velocity of the mobile station 104 does not exceed the velocity threshold, then the functionality of the mobile station 104 may remain active.

Additionally, in some embodiments, the user of the mobile station 104 may be allowed to override the restrictive actions by issuing an override command from the mobile station 104 to the appropriate network component of the network system 100. Also, in some embodiments, the applicable network component may send a notification to the mobile station 104 via the wireless network 102 in order to notify a user of the mobile station 104 that the attempted communication is subject to the restrictive action. Also, in situations where the mobile station 104 is the target destination of the network communication, the applicable network component may notify a sender of the incoming communication that the mobile station 104 is unavailable for completion of the incoming communication. Additionally, in some embodiments, the mobile user can send a text-to-short message or the like to get permission to operate the mobile station 104 while restricted. In such case, a subscriber will receive a request from the mobile user and will then have the option to accept, decline, or take another action in response to the mobile user's request. The action taken by the record owner can be for a single session, for some number of sessions, or for all sessions.

There are multiple ways in which the velocity threshold may be specified. In some embodiments, the velocity threshold is specific to a particular user, or subscriber, of the mobile station 104. In another embodiment, the same velocity threshold is applied to a group of users, or subscribers, of different mobile stations 104. In another embodiment, the user, or subscriber, of each mobile station 104 can independently specify the corresponding velocity threshold. In another embodiment, the velocity threshold may be a default velocity threshold that the user, or subscriber, cannot change. In another embodiment, a limited number of users of a group of users may have access to configure the velocity threshold, while other users of the same group may be prevented from accessing or configuring the velocity threshold. For example, a parent may have access to set (or enable) the velocity control for certain users on a "family plan" for mobile telephone services, while a child may be denied access to set (or disable) the velocity control. References to the velocity control indicate the ability to turn the feature on or off. By way of comparison, the velocity threshold refers to the speed above which the control takes effect, or the restrictive action is implemented. In some embodiments, the velocity threshold includes other criteria in addition to a velocity magnitude. For example, the velocity threshold may be defined by a logical test of various criteria and/or a combination of multiple magnitudes corresponding to different possible activities and/or restrictive actions. As one example, a subscriber (e.g., a parent) may set a control for "no texting while driving," and the carrier defines what the speed above which the mobile station 104 is considered to be moving with a user (e.g., a child) who is driving. Typically, the parent would access a control page on a web site where the mobile control features can be invoked. If texting while driving is to be blocked, the parent would activate that condition in the child's profile. In one embodiment, the actual velocity threshold that defines when the mobile is being driven would be set by the service operator in the service parameters. For example, a speed greater than 15 mph indicates that the child is in a moving vehicle.

The restrictive action(s) taken in response to a determination that the computed velocity exceeds the velocity threshold may depend on the type of network communication that is attempted by the mobile station 104 (in mobile originating operations) or which involves the mobile station 104 as a destination device (in mobile terminating operations). One example of a restrictive action includes discarding the attempted communication. This is similar to the situation in which a communication is dropped after a failed forwarding attempt under a forward-and-forget delivery scheme. Another example of a restrictive action includes storing the attempted communication for later delivery. This is similar to the situation in which a communication is stored after a failed forwarding attempt under a store-and-forward delivery scheme. The subsequent delivery attempt may depend, in some cases, on a subsequent determination that a subsequently computed velocity of the mobile station 104 is less than the velocity threshold for the mobile station 104. In other words, the communication is allowed to proceed once the mobile station 104 is no longer moving faster than the velocity threshold. In some embodiments, the mobile station 104 may be required to remain below the velocity threshold for a period of time prior to removing the restriction on the affected functionality of the mobile station 104.

By implementing embodiments of the network system 100 described herein to restrict functionality available to a mobile station 104 in communication with the network system 100, embodiments of the network system 100 allow activity at the mobile station 104 to be detected by network components that are normally in the message flow to provide services. Embodiments of the network system 100 also allow those network components to check for the velocity of the mobile station 104 before allowing corresponding services. In this way, the network system 100 may control the functionality available to the mobile station 104 using velocity based controls, without requiring any software installations on the mobile station 104. Thus, embodiments of the network system 100 can be used to implement velocity based controls for any mobile station 104 that can be located accurately enough to determine or estimate the speed of the mobile station 104.

Furthermore, embodiments of the network system 100 are capable of computing the velocity of the mobile station 104 outside of the mobile station 104. Thus, in specific embodiments, the network system 100 is capable of computing the velocity of the mobile station 104 without requiring the mobile station 104 to process specific information, utilize processing resources of the mobile station 104, or otherwise invoke a specific location application on the mobile station 104.

Also, although some embodiments may allow interactions by the user, other embodiments may be implemented that do not require such interactions. So users, or subscribers, may benefit from such network-based management without implementing changes or configuring settings on the mobiles station 104.

Figure 2:
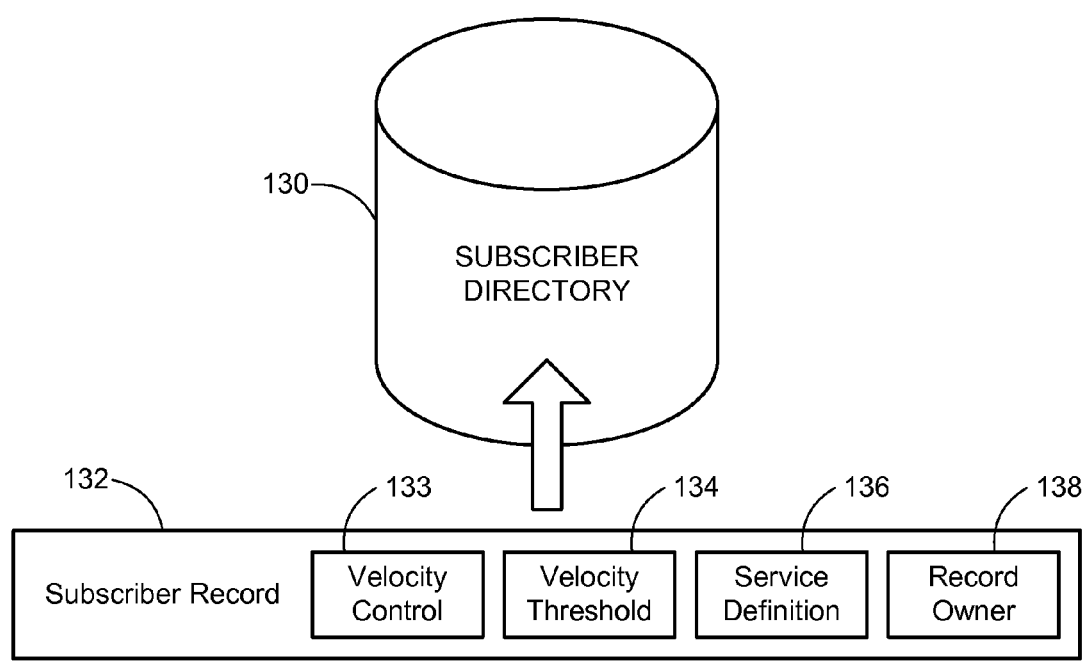
FIG. 2 depicts one embodiment of subscriber directory that may be referenced by one or more of the components of the network system of FIG. 1.

FIG. 2 depicts one embodiment of subscriber directory 130 that may be referenced by one or more of the components of the network system 100 of FIG. 1. In one embodiment, the subscriber directory 130 is stored on an electronic data storage device operably coupled to the MCP 108. In another embodiment, the electronic data storage device may be operably coupled to another component within the network system 100. Alternatively, the electronic data storage device may be remotely located and accessible by one or more of the components of the network system 100.

The subscriber directory 130 includes one or more subscriber records 132. Each subscriber record 132 includes subscription information about a subscriber corresponding to a mobile station 104. While embodiments of the subscriber record 132 may include a substantial amount of data about the subscription fees, subscriber preferences, functionality, and so forth for a particular subscriber or mobile station 104, the illustrated subscription record 132 includes a velocity control field 133, a velocity threshold field 134, and a service definition field 136. The illustrated subscription record 132 also includes a record owner field 138.

In one embodiment, the velocity control field 133 stores a flag to indicate whether the velocity controls are enabled or disabled for the corresponding mobile user. In some embodiments, the velocity control field 133 stores multiple flags to indicate the enabled/disabled status of corresponding functionality for various communication modes. In some embodiments, the subscriber is able to individually set/reset one or more of the flags within the velocity control field 133 to independently enable velocity controls and the corresponding restrictive actions.

In one embodiment, the velocity threshold field 134 stores the velocity threshold applicable to the corresponding mobile station 104. As explained above, the velocity threshold includes at least a velocity indicative of movement of a traveling vehicle. In some embodiments, the velocity threshold may be set by a carrier, in which case the subscriber record 132 may omit the velocity threshold field 134 or, alternatively, may restrict user access to modify the parameter(s) of the velocity threshold field 134.

The service definition field 136 stores a service definition. The service definition stores at least one rule to define the restrictive action(s) for implementation in response to a determination that the computed velocity of the corresponding mobile station 104 exceeds the velocity threshold. Examples of restrictive actions are provided above. In some embodiments, the service definition may include logical conditions which are prerequisite to implementation of certain restrictive actions.

In one embodiment, the record owner field 138 stores a name and/or contact information for the record owner. In this way, the carrier may contact the record owner whenever a restrictive action is implemented. In one example, where the record owner is a parent and the mobile user is a child, the parent may be contacted as the record owner each time a restrictive action is implemented on the mobile station 104 of the child. In this way the record owner may know the activity of the mobile user. Also, in some embodiments, the record owner may be able to override the restrictive action implemented on the user's mobile station 104. For example, the parent may receive a text message indicating that an outgoing call was attempted on the child's mobile station 104 while the child was driving, and the parent may respond to the text message with an override command in order to override the restrictions and allow the child to place the outgoing call while the child is moving at traffic speeds.

Figure 3:
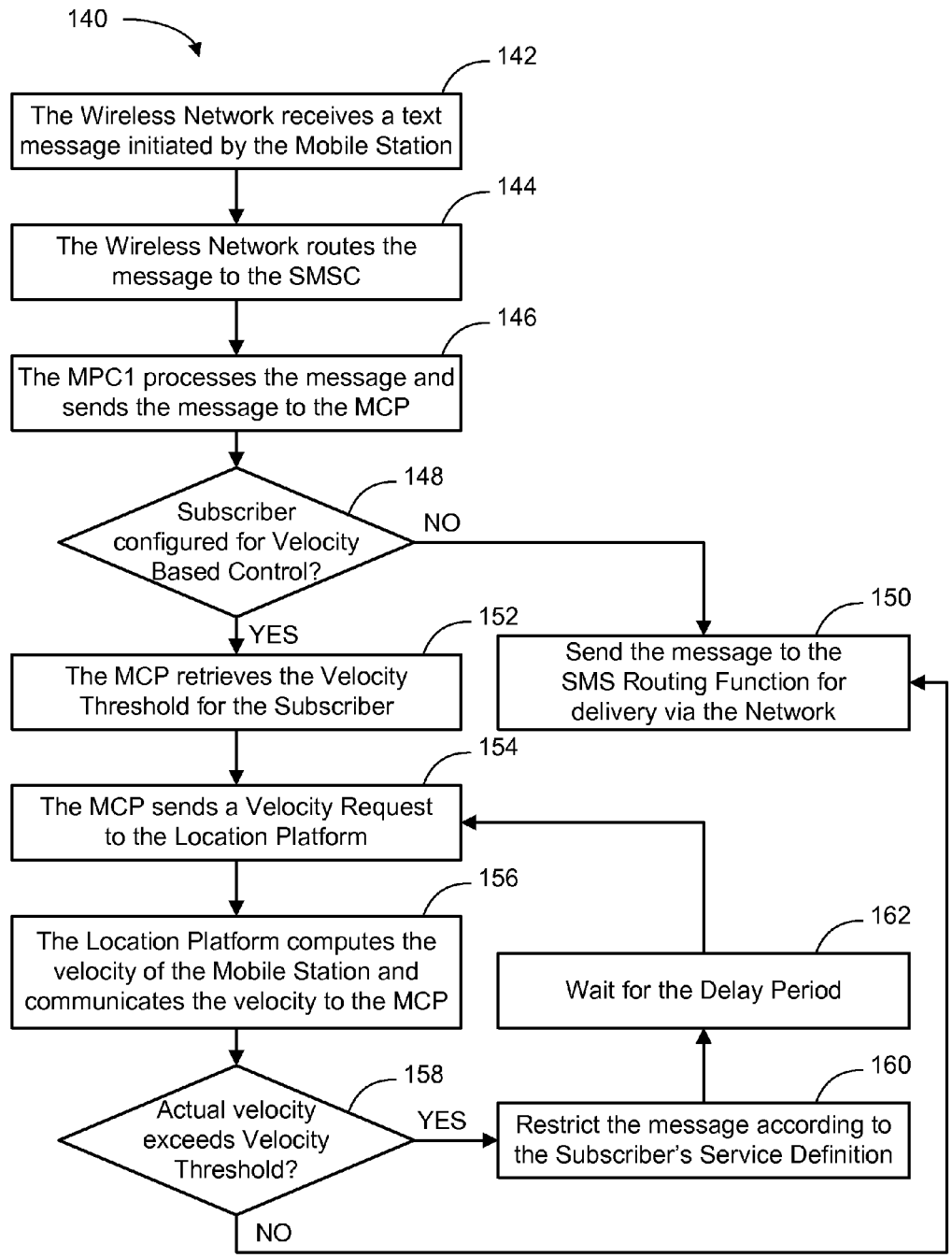
FIG. 3 depicts a flow chart diagram of one embodiment of a method for the network system of FIG. 1 to control outgoing text message communications.

FIG. 3 depicts a flow chart diagram of one embodiment of a method 140 for the network system 100 of FIG. 1 to control outgoing text message communications. This method 140 corresponds to the scenario in which the text messaging operations are mobile originating operations. Although the method 140 is described in conjunction with the network system 100 of FIG. 1, embodiments of the method 140 may be implemented with other types of network systems.

At block 142, the wireless network 102 receives a text message initiated by the mobile station 104. At block 144, the wireless network 102 routes the text message to the MPC1 106. At block 146, the MPC1 106 processes the text message and sends the text message to the MCP 108. At block 148, the MCP 108 determines if the subscriber for the mobile station 104 is configured for velocity based control of the mobile station 104. In some embodiments, the subscriber may pay an additional fee or may subscribe to a specific communication plan in order to be configured for velocity based control of the mobile station 104. If the subscriber is not configured for velocity based control, then at block 150 the MCP 108 sends the text message to the SMS routing function 110 for delivery via the network 112.

If the subscriber is configured for velocity based control, then at block 152, the MCP 108 retrieves the velocity threshold, for example, from the corresponding subscriber record stored in the subscriber directory 130. At block 154, the MCP 108 sends a velocity request (e.g., a velocity API) to the location platform 122. In response to the velocity request, at block 156 the location platform 122 computes the velocity of the mobile station 104 and communicates the velocity of the mobile station 104 to the MCP 108.

Using the velocity threshold and the computed velocity for the mobile station 104, at block 158 the MCP 108 determines if the actual (i.e., computed) velocity of the mobile station 104 exceeds the velocity threshold specified for the mobile station 104. If the actual velocity does not exceed the velocity threshold, then at block 150 the MCP 108 sends the text message to the SMS routing function 110 for delivery via the network 112. Otherwise, if the actual velocity exceeds the velocity threshold, then at block 160 the MCP 108 restricts the text message according to the service definition for the corresponding subscriber of the mobile station 104. In embodiments which utilize a store-and-forward type of delivery scheme, at block 162 the MCP 108 may wait for a delay period before returning to block 154 to send a new velocity request to the location platform 122 and repeating the other operations described above. The depicted method 140 then ends.

Figure 4:
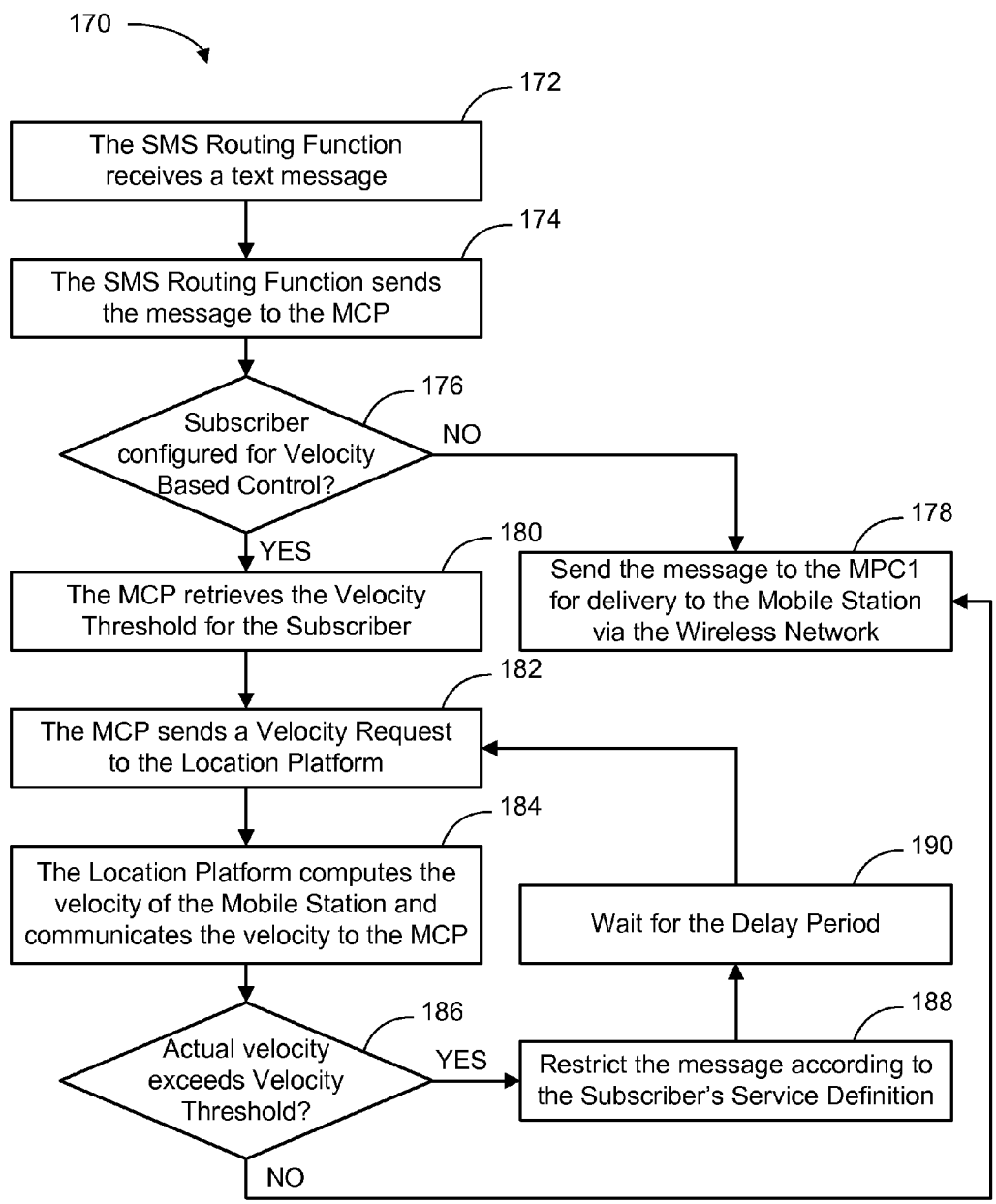
FIG. 4 depicts a flow chart diagram of one embodiment of a method for the network system of FIG. 1 to control incoming text message communications.

FIG. 4 depicts a flow chart diagram of one embodiment of a method 170 for the network system 100 of FIG. 1 to control incoming text message communications. This method 170 corresponds to the scenario in which the text messaging operations are mobile terminating operations. Although the method 170 is described in conjunction with the network system 100 of FIG. 1, embodiments of the method 170 may be implemented with other types of network systems.

At block 172, the SMS routing function 110 receives a text message destined for the mobile station 104. At block 174, the SMS routing function 110 sends the text message to the MCP 108. At block 176, the MCP 108 determines if the subscriber for the mobile station 104 is configured for velocity based control of the mobile station 104. If the subscriber is not configured for velocity based control, then at block 178 the MCP 108 sends the text message to the MPC1 106 for delivery to the mobile station 104 via the wireless network 102.

If the subscriber is configured for velocity based control, then at block 180, the MCP 108 retrieves the velocity threshold, for example, from the corresponding subscriber record stored in the subscriber directory 130. At block 182, the MCP 108 sends a velocity request (also referred to as a velocity API because the velocity request may originate from an application program interface (API) on one of the network components) to the location platform 122. In response to the velocity request, at block 184 the location platform 122 computes the velocity of the mobile station 104 and communicates the velocity of the mobile station 104 to the MCP 108.

Using the velocity threshold and the computed velocity for the mobile station 104, at block 186 the MCP 108 determines if the actual (i.e., computed) velocity of the mobile station 104 exceeds the velocity threshold specified for the mobile station 104. If the actual velocity does not exceed the velocity threshold, then at block 178 the MCP 108 sends the text message to the MPC1 106 for delivery to the mobile station 104 via the wireless network 102. Otherwise, if the actual velocity exceeds the velocity threshold, then at block 188 the MCP 108 restricts the text message according to the service definition for the corresponding subscriber of the mobile station 104. In embodiments which utilize a store-and-forward type of delivery scheme, at block 190 the MCP 108 may wait for a delay period before returning to block 182 to send a new velocity request to the location platform 122 and repeating the other operations described above. The depicted method 170 then ends.

Figure 5:
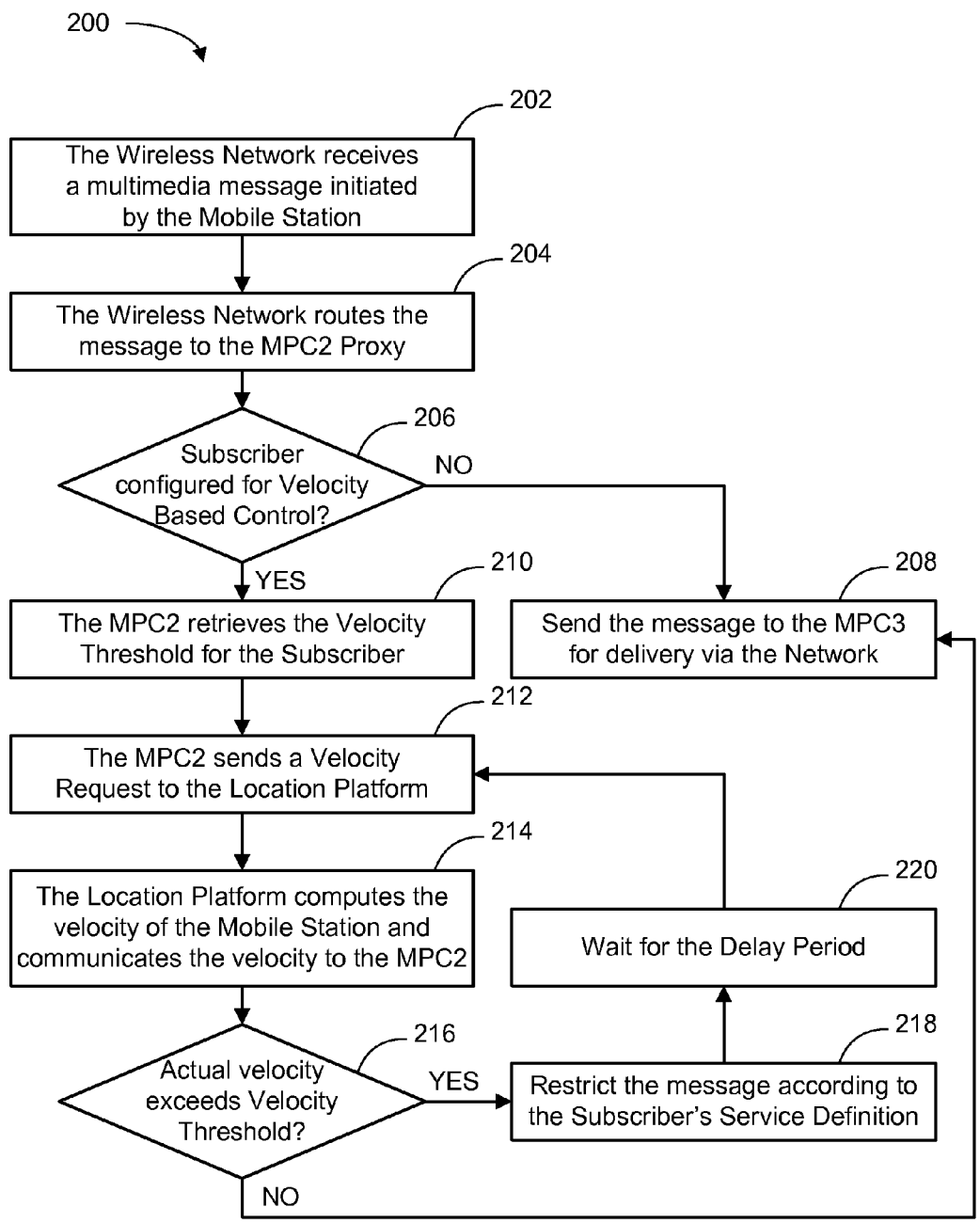
FIG. 5 depicts a flow chart diagram of one embodiment of a method for the network system of FIG. 1 to control outgoing multimedia message communications.

FIG. 5 depicts a flow chart diagram of one embodiment of a method 200 for the network system 100 of FIG. 1 to control outgoing multimedia message communications. This method 200 corresponds to the scenario in which the multimedia messaging operations are mobile originating operations. Although the method 200 is described in conjunction with the network system 100 of FIG. 1, embodiments of the method 200 may be implemented with other types of network systems.

At block 202, the wireless network 102 receives a multimedia message initiated by the mobile station 104. At block 204, the wireless network 102 routes the multimedia message to the MPC2 114. At block 206, the MPC2 114 determines if the subscriber for the mobile station 104 is configured for velocity based control of the mobile station 104. If the subscriber is not configured for velocity based control, then at block 208 the MPC2 114 sends the multimedia message to the MPC3 116 for delivery of the multimedia message via the network 112.

If the subscriber is configured for velocity based control, then at block 210, the MPC2 114 retrieves the velocity threshold, for example, from the corresponding subscriber record stored in the subscriber directory 130. At block 212, the MPC2 114 sends a velocity request (e.g., a velocity API) to the location platform 122. In response to the velocity request, at block 214 the location platform 122 computes the velocity of the mobile station 104 and communicates the velocity of the mobile station 104 to the MPC2 114.

Using the velocity threshold and the computed velocity for the mobile station 104, at block 216 the MPC2 114 determines if the actual (i.e., computed) velocity of the mobile station 104 exceeds the velocity threshold specified for the mobile station 104. If the actual velocity does not exceed the velocity threshold, then at block 208 the MPC2 114 sends the multimedia message to the MPC3 116 for delivery of the multimedia message via the network 112. Otherwise, if the actual velocity exceeds the velocity threshold, then at block 218 the MPC2 114 restricts the multimedia message according to the service definition for the corresponding subscriber of the mobile station 104. In embodiments which utilize a store-and-forward type of delivery scheme, at block 220 the MPC2 114 may wait for a delay period before returning to block 212 to send a new velocity request to the location platform 122 and repeating the other operations described above. The depicted method 200 then ends.

Figure 6:
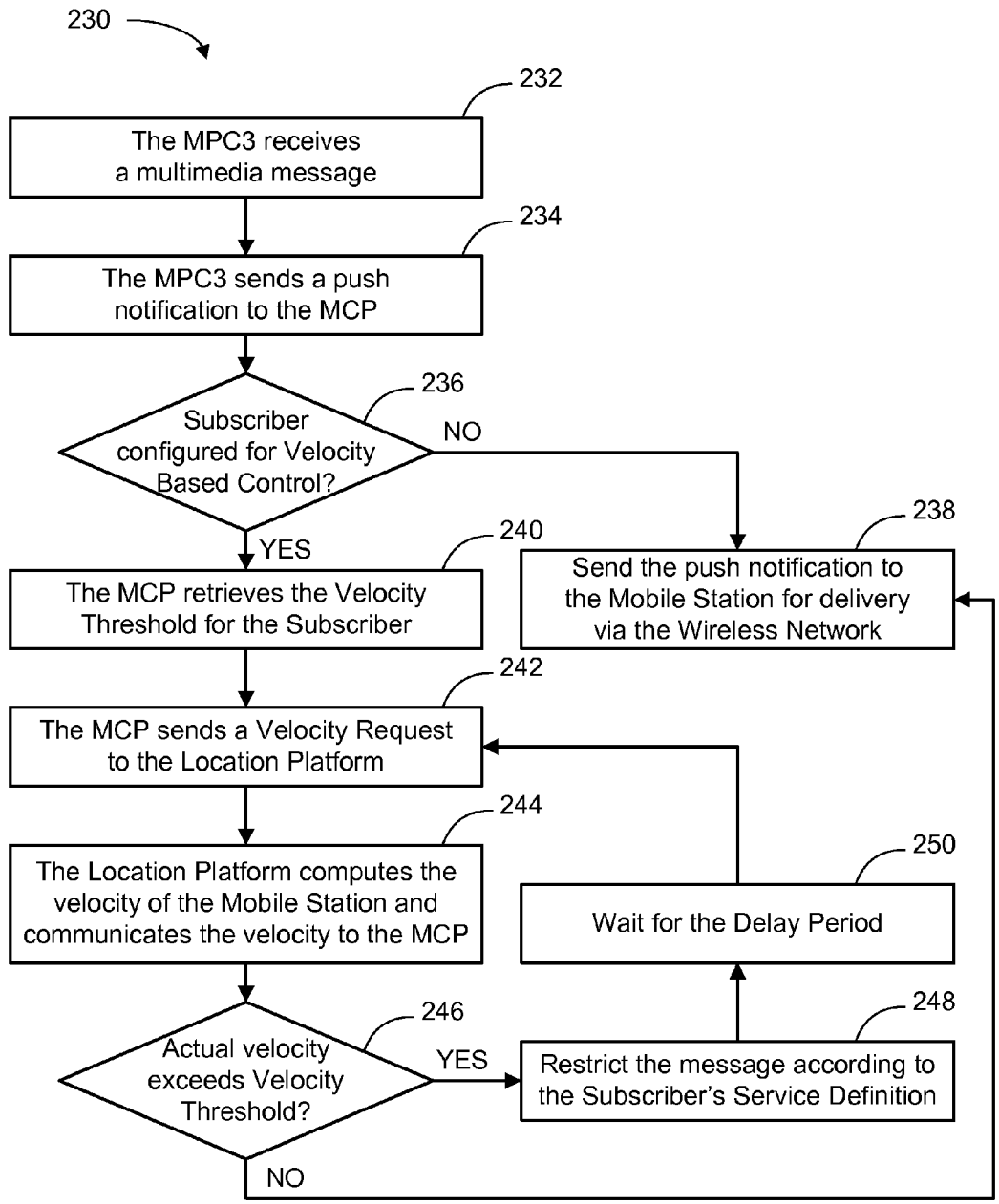
FIG. 6 depicts a flow chart diagram of one embodiment of a method for the network system of FIG. 1 to control incoming multimedia message communications.

FIG. 6 depicts a flow chart diagram of one embodiment of a method 230 for the network system 100 of FIG. 1 to control incoming multimedia message communications. This method 230 corresponds to the scenario in which the multimedia messaging operations are mobile terminating operations. Although the method 230 is described in conjunction with the network system 100 of FIG. 1, embodiments of the method 230 may be implemented with other types of network systems.

At block 232, the MPC3 116 receives a multimedia message destined for the mobile station 104. At block 234, the MPC3 116 sends a push notification to the MCP 108. At block 236, the MCP 108 determines if the subscriber for the mobile station 104 is configured for velocity based control of the mobile station 104. If the subscriber is not configured for velocity based control, then at block 238 the MCP 108 sends the push notification to the mobile station 104 for delivery of the multimedia message to the mobile station 104 via the wireless network 102.

If the subscriber is configured for velocity based control, then at block 240, the MCP 108 retrieves the velocity threshold, for example, from the corresponding subscriber record stored in the subscriber directory 130. At block 242, the MCP 108 sends a velocity request (e.g., a velocity API) to the location platform 122. In response to the velocity request, at block 244 the location platform 122 computes the velocity of the mobile station 104 and communicates the velocity of the mobile station 104 to the MCP 108.

Using the velocity threshold and the computed velocity for the mobile station 104, at block 246 the MCP 108 determines if the actual (i.e., computed) velocity of the mobile station 104 exceeds the velocity threshold specified for the mobile station 104. If the actual velocity does not exceed the velocity threshold, then at block 238 the MCP 108 sends the push notification to the mobile station 104 for delivery of the multimedia message to the mobile station 104 via the wireless network 102. Otherwise, if the actual velocity exceeds the velocity threshold, then at block 248 the MCP 108 restricts the multimedia message according to the service definition for the corresponding subscriber of the mobile station 104. In embodiments which utilize a store-and-forward type of delivery scheme, at block 250 the MCP 108 may wait for a delay period before returning to block 242 to send a new velocity request to the location platform 122 and repeating the other operations described above. The depicted method 230 then ends.

Figure 7:
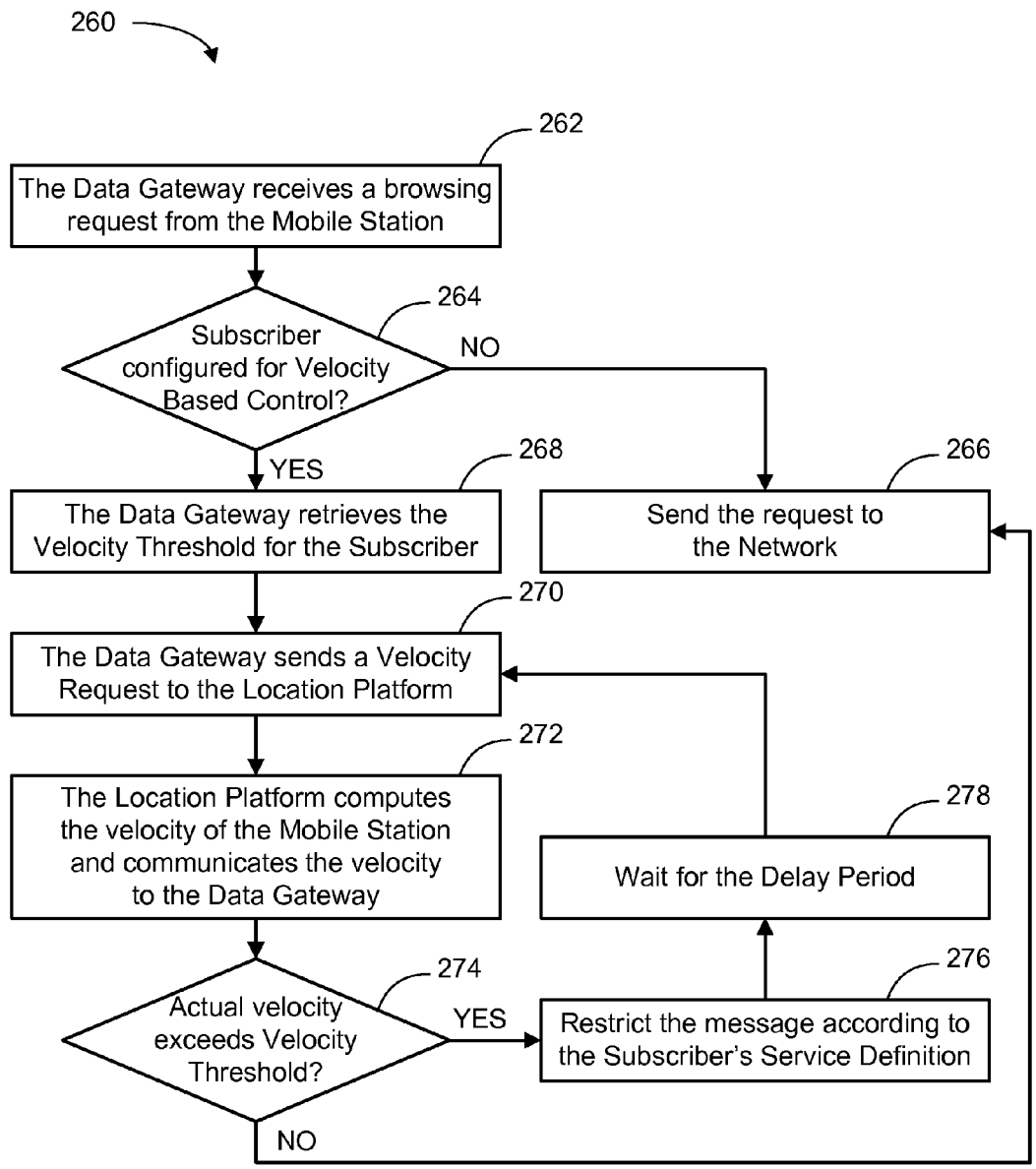
FIG. 7 depicts a flow chart diagram of one embodiment of a method for the network system of FIG. 1 to control mobile browsing communications.

FIG. 7 depicts a flow chart diagram of one embodiment of a method 260 for the network system 100 of FIG. 1 to control mobile browsing communications. This method 260 corresponds to the scenario in which the mobile browsing operations are mobile originating operations. Although the method 260 is described in conjunction with the network system 100 of FIG. 1, embodiments of the method 260 may be implemented with other types of network systems.

At block 262, the data gateway 118 receives a browsing request initiated by the mobile station 104. At block 264, the data gateway 118 determines if the subscriber for the mobile station 104 is configured for velocity based control of the mobile station 104. If the subscriber is not configured for velocity based control, then at block 266 the data gateway 118 sends the browsing request to the network 112.

If the subscriber is configured for velocity based control, then at block 268, the data gateway 118 retrieves the velocity threshold, for example, from the corresponding subscriber record stored in the subscriber directory 130. At block 270, the data gateway 118 sends a velocity request (e.g., a velocity API) to the location platform 122. In response to the velocity request, at block 272 the location platform 122 computes the velocity of the mobile station 104 and communicates the velocity of the mobile station 104 to the data gateway 118.

Using the velocity threshold and the computed velocity for the mobile station 104, at block 274 the data gateway 118 determines if the actual (i.e., computed) velocity of the mobile station 104 exceeds the velocity threshold specified for the mobile station 104. If the actual velocity does not exceed the velocity threshold, then at block 266 the data gateway 118 sends the browsing request to the network 112. Otherwise, if the actual velocity exceeds the velocity threshold, then at block 268 the data gateway 118 restricts the browsing request according to the service definition for the corresponding subscriber of the mobile station 104. In one embodiment, the service definition indicates discarding the browsing request. Additionally, the data gateway 118 may send an error notification to the user of the mobile station 104 to indicate that mobile browsing functionality is restricted while the mobile station 104 is traveling at transportation speeds. In embodiments which utilize a store-and-forward type of delivery scheme, at block 278 the data gateway 118 may wait for a delay period before returning to block 270 to send a new velocity request to the location platform 122 and repeating the other operations described above. The depicted method 260 then ends.

Figure 8:
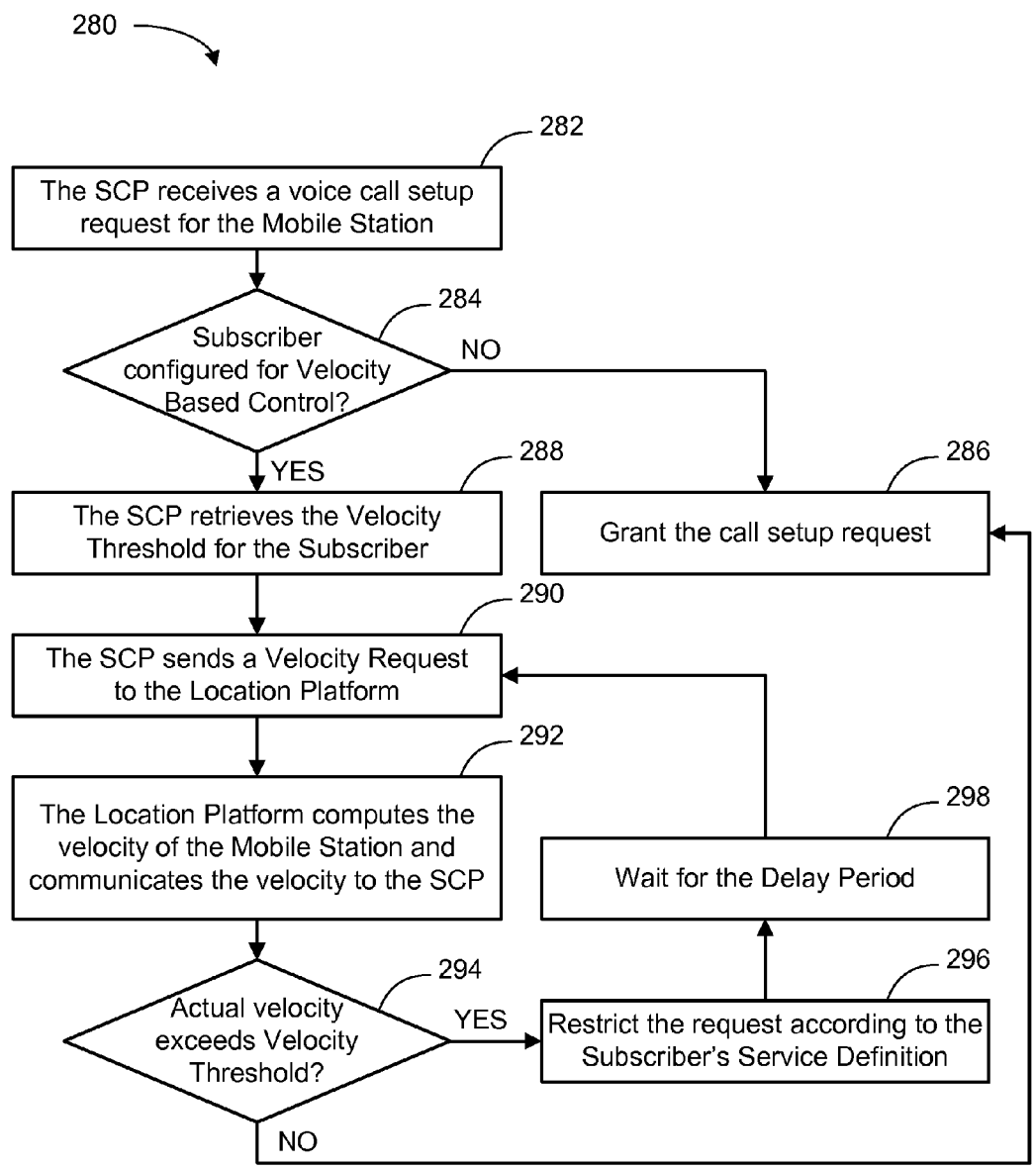
FIG. 8 depicts a flow chart diagram of one embodiment of a method for the network system of FIG. 1 to control voice calling communications.

FIG. 8 depicts a flow chart diagram of one embodiment of a method 280 for the network system 100 of FIG. 1 to control voice calling communications. This method 280 corresponds to the scenarios in which the voice calling operations are either mobile originating or mobile terminating operations. Although the method 280 is described in conjunction with the network system 100 of FIG. 1, embodiments of the method 280 may be implemented with other types of network systems.

At block 282, the SCP 120 receives a browsing request initiated by or destined for the mobile station 104. At block 284, the SCP 120 determines if the subscriber for the mobile station 104 is configured for velocity based control of the mobile station 104. If the subscriber is not configured for velocity based control, then at block 286 the SCP 120 grants the call setup request, and the mobile station 104 is allowed to participate in the voice call.

If the subscriber is configured for velocity based control, then at block 288, the SCP 120 retrieves the velocity threshold, for example, from the corresponding subscriber record stored in the subscriber directory 130. At block 290, the SCP 120 sends a velocity request (e.g., a velocity API) to the location platform 122. In response to the velocity request, at block 292 the location platform 122 computes the velocity of the mobile station 104 and communicates the velocity of the mobile station 104 to the SCP 120.

Using the velocity threshold and the computed velocity for the mobile station 104, at block 294 the SCP 120 determines if the actual (i.e., computed) velocity of the mobile station 104 exceeds the velocity threshold specified for the mobile station 104. If the actual velocity does not exceed the velocity threshold, then at block 286 the SCP 120 grants the call setup request, and the mobile station 104 is allowed to participate in the voice call. Otherwise, if the actual velocity exceeds the velocity threshold, then at block 296 the SCP 120 restricts the voice call request according to the service definition for the corresponding subscriber of the mobile station 104. In one embodiment, the service definition indicates discarding the voice call request. In another embodiment, the service definition indicates sending an incoming call directly to voicemail. In another embodiment, the service definition indicates notifying a user of the mobile station 104 that an outgoing call is not permitted while the mobile station 104 is traveling at transportation speeds. In embodiments which utilize a store-and-forward type of delivery scheme, at block 298 the SCP 120 may wait for a delay period before returning to block 290 to send a new velocity request to the location platform 122 and repeating the other operations described above. The depicted method 280 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A communication network comprising:
   a wireless network with a base station configured to send data to and receive data from a mobile station via radio frequency communication signals; and
   a location platform operably coupled to the wireless network, the location platform configured to:

a) receive a velocity request for the mobile station from the wireless network; and b) in response to the received velocity request, facilitate a computation of a velocity of the mobile station;

the communication network further comprising at least one network component operably coupled between the wireless network and the location platform, the at least one network component being configured to:

i) receive an attempted communication involving the mobile station;

ii) in response to receiving the attempted communication, communicate a velocity request for the mobile station to the location platform;

iii) receive a response to the velocity request from the location platform;

iv) compare the computed velocity of the mobile station with a velocity threshold;

v) in response to a determination that the computed velocity exceeds the velocity threshold, implement a restrictive action for the attempted communication by storing the attempted communication and repeat at least steps ii) to iv); and vi) in response to a determination that the computed velocity does not exceed the velocity threshold, deliver the attempted communication to the mobile station.

2. The communication network of claim 1, further comprising an electronic data storage device operably coupled to the at least one network component, the electronic data storage device to store a subscriber directory comprising a subscriber record for a user of the mobile station, wherein the subscriber record comprises a velocity threshold field to store the velocity threshold for the mobile station.

3. The communication network of claim 2, wherein the subscriber record further comprises a service definition field to store at least one rule to define the restrictive action for implementation in response to the determination that the computed velocity exceeds the velocity threshold.

4. The communication network of claim 2, wherein the subscriber record further comprises a record owner field to store at least one identifier to identify an owner of the mobile station.

5. The communication network of claim 1, wherein the at least one network component is further configured to send a notification to a record owner of the mobile station, wherein the notification indicates to the record owner that the attempted communication with the mobile station is subject to the restrictive action.

6. The communication network of claim 5, wherein the at least one network component is further configured to override the restrictive action for the attempted communication in response to an override command from the record owner of the mobile station.

7. The communication network of claim 1, wherein the at least one network component is further configured to implement the restrictive action in response to a further determination that the attempted communication is an incoming communication with the mobile station as a target destination for the attempted communication.

8. The communication network of claim 7, wherein the at least one network component is further configured to notify a sender of the incoming communication that the mobile station is unavailable for completion of the incoming communication.

9. The communication network of claim 1, wherein the at least one network component is further configured to implement the restrictive action in response to a further determination that the attempted communication is an outgoing communication with the mobile station as a source of the attempted communication.

10. The communication network of claim 1, wherein the at least one network component is selected from a group consisting of:

a short message service center (SMSC) operably coupled between the wireless network, and an external network wherein the attempted communication comprises an outgoing text message originating at the mobile station;

a message control point (MCP) operably coupled between the wireless network and the external network, wherein the attempted communication comprises an incoming text message or an incoming multimedia message destined for the mobile station;

a multimedia interface (MM1) proxy operably coupled between the wireless network and a multimedia message service center (MMSC), wherein the attempted communication comprises an outgoing multimedia message originating at the mobile station;

a data gateway operably coupled between the wireless network and the external network, wherein the attempted communication comprises an outgoing browsing request originating at the mobile station; and a service control point (SCP) operably coupled to the wireless network, wherein the attempted communication comprises a voice call setup request involving the mobile station.

11. The communication network of claim 1, wherein the attempted communication is a multimedia message, and wherein the communication network comprises a first network component and a second network component, wherein the first network component is configured to:

a) receive the multimedia message; and b) in response to receiving the multimedia message, send a push notification to the second network component, and wherein the second network component is configured to:

i) in response to receiving the push notification, communicate the velocity request for the mobile station to the location platform;

ii) receive a response to the velocity request from the location platform;

iii) compare the computed velocity of the mobile station with a velocity threshold;

iv) in response to a determination that the computed velocity exceeds the velocity threshold, implement the restrictive action for the multimedia message by storing the multimedia message and repeat at least steps i) to iii); and v) in response to a determination that the computed velocity does not exceed the velocity threshold, send the push notification to the mobile station to enable delivery of the multimedia message.

12. A method for controlling network communications, the method comprising:

i) receiving a request to initiate a network communication between a mobile station operably coupled to a wireless network and another communication device;

ii) in response to the request to initiate the network communication, communicating a velocity request to a location platform operably coupled to the wireless network;

iii) in response to the velocity request, facilitating a computation of a velocity of the mobile station;

iv) receiving a response to the velocity request from the location platform;

v) comparing the computed velocity of the mobile station with a velocity threshold;

vi) in response to a determination that the computed velocity of the mobile station exceeds the velocity threshold, implementing a network-based restrictive action to prevent completion of the network communication by storing the network communication, and repeating at least steps ii) to v) wherein the network-based restrictive action occurs at at least one network component separate from the mobile station; and vii) in response to a determination that the computed velocity of the mobile station does not exceed the velocity threshold, delivering the network communication to the mobile station.

13. The method of claim 12, further comprising accessing a subscriber record corresponding to the mobile station, wherein the subscriber record is stored on an electronic data storage device operably coupled to the wireless network, and the subscriber record stores the velocity threshold, wherein the velocity threshold defines a velocity indicative of movement of a traveling vehicle.

14. The method of claim 12, further comprising accessing a subscriber record corresponding to the mobile station, wherein the subscriber record is stored on an electronic data storage device operably coupled to the wireless network, and the subscriber record stores a service definition with at least one rule to define the restrictive action.

15. The method of claim 12, further comprising sending a notification to a record owner of the mobile station, wherein the notification indicates to the record owner that the network communication with the mobile station is subject to the restrictive action.

16. The method of claim 15, further comprising overriding the restrictive action for the attempted communication in response to an override command from the record owner of the mobile station.

17. The method of claim 10, further comprising notifying a sender of the request to initiate the network communication that the mobile station is unavailable for completion of the network communication.

18. The method of claim 12, wherein the network communication is a multimedia message, the method further comprising:

sending a push notification to the at least one network component in response to receiving the multimedia message;

communicating the velocity request in response to receiving the push notification at the at least one network component; and in response to a determination that the computed velocity of the mobile station does not exceed the velocity threshold, sending the push notification from the at least one network component to the mobile station to enable delivery of the multimedia message.

19. A method for controlling text messaging on a mobile station, the method comprising:

i) receiving a request to initiate a text message between a mobile station and another communication device;

ii) in response to the request to initiate the text message, communicating a velocity request to a location platform operably coupled to the wireless network;

iii) in response to the velocity request, facilitating a computation of a velocity of the mobile station, wherein the velocity of the mobile station is computed outside of the mobile station;

iv) receiving a response to the velocity request from the location platform;

v) comparing the computed velocity of the mobile station with a velocity threshold, wherein the computed velocity is compared with the velocity threshold within at least one network component outside of the mobile station;

vi) in response to a determination that the computed velocity of the mobile station exceeds the velocity threshold, implementing a network-based restrictive action to prevent delivery of the text message by storing the text message, and repeating at least steps ii) to v), wherein the network-based restrictive action occurs at at least one network component separate from the mobile station; and vii) in response to a determination that the computed velocity of the mobile station does not exceed the velocity threshold, delivering the text message to the mobile station.

* * * * *